US011067191B2

United States Patent
Vestergaard et al.

(10) Patent No.: US 11,067,191 B2
(45) Date of Patent: Jul. 20, 2021

(54) TOP COVER FOR A SOFT THROTTLING VALVE BODY, SOFT THROTTLING VALVE AND METHOD FOR ASSEMBLING A SOFT THROTTLING VALVE

(71) Applicant: Danfoss A/S, Nordborg (DK)

(72) Inventors: Niels P. Vestergaard, Nordborg (DK); Detlef Matzen, Nordborg (DK); Rajakumar Kanajam, Chennai (IN); Raghavendra Venkatesh, Chennai (IN); Torben Schack Fabricius, Nordborg (DK)

(73) Assignee: DANFOSS A/S, Nordborg (DK)

( * ) Notice: Subject to any disclaimer, the term of this patent is extended or adjusted under 35 U.S.C. 154(b) by 65 days.

(21) Appl. No.: 16/345,964

(22) PCT Filed: Oct. 27, 2017

(86) PCT No.: PCT/EP2017/077549
§ 371 (c)(1),
(2) Date: Apr. 29, 2019

(87) PCT Pub. No.: WO2018/083015
PCT Pub. Date: May 11, 2018

(65) Prior Publication Data
US 2020/0063887 A1 Feb. 27, 2020

(30) Foreign Application Priority Data

Nov. 1, 2016 (IN) .............................. 201611037311
Apr. 7, 2017 (EP) ..................................... 17165521

(51) Int. Cl.
*F16K 31/122* (2006.01)
*F16K 31/124* (2006.01)
(Continued)

(52) U.S. Cl.
CPC ...... *F16K 31/1221* (2013.01); *F16K 31/1245* (2013.01); *F25B 41/20* (2021.01); *F25B 47/022* (2013.01)

(58) Field of Classification Search
CPC .. F16K 31/1245; F16K 31/1221; F25B 41/04; F25B 47/022
See application file for complete search history.

(56) References Cited

U.S. PATENT DOCUMENTS 3,168,901 A   2/1965   Murakami
3,185,344 A * 5/1965   Kenney ................ G05D 7/0193
                                              222/20
(Continued)

FOREIGN PATENT DOCUMENTS

CN       1932352 A    3/2007
CN     101614288 A   12/2009
(Continued)

OTHER PUBLICATIONS

International Search Report for PCT Serial No. PCT/EP2016/054303 dated Jun. 3, 2016.
(Continued)

*Primary Examiner* — Umashankar Venkatesan
(74) *Attorney, Agent, or Firm* — McCormick, Paulding & Huber PLLC

(57) ABSTRACT

The present invention relates to a top cover (5) for soft throttling valve body (2), the top cover (5) comprising one or more fluid conduits for transferring a pilot fluid flow for setting a degree of opening of a main valve situated in a soft throttling valve body to the soft throttling valve body. Furthermore, the invention relates to a soft throttling valve (1) and a method for assembling the soft throttling valve (1). The object of the invention is to allow a good control of the pilot fluid flow while protecting the soft throttling valve body from damage due to valve failure. The object is solved
(Continued)

by having a follower arrangement arranged to throttle the pilot fluid flow depending on the degree of opening of the main valve, further having a manual opening arrangement for manually opening the main valve and/or by further preventing a step-wise opening of the main valve in less than two opening steps. A method for assembling a soft throttling valve is also disclosed.

19 Claims, 10 Drawing Sheets

(51) Int. Cl.
 *F25B 47/02* (2006.01)
 *F25B 41/20* (2021.01)

(56) References Cited

U.S. PATENT DOCUMENTS

| | | | |
|---|---|---|---|
| 3,415,269 A | 12/1968 | Salerno | |
| 3,698,437 A | 10/1972 | Cox | |
| 3,957,244 A | 5/1976 | Chauvigne | |
| 4,248,377 A | 2/1981 | Jakobsen | |
| 4,471,940 A | 9/1984 | Zeuner et al. | |
| 4,848,721 A | 7/1989 | Chudakov | |
| 4,936,541 A | 6/1990 | Oksanen et al. | |
| 5,070,707 A | 12/1991 | Ni | |
| 8,091,582 B2 | 1/2012 | Folk | |
| 9,097,360 B2 * | 8/2015 | Mesner | F15B 13/0835 |
| 2003/0111627 A1 | 6/2003 | Winslow et al. | |
| 2006/0197041 A1 * | 9/2006 | Szymaszek | F16K 31/1245 251/30.02 |
| 2008/0251146 A1 * | 10/2008 | Folk | F16K 31/365 137/624.27 |
| 2010/0117012 A1 | 5/2010 | Szymaszek | |
| 2010/0155633 A1 | 6/2010 | Pfaff | |
| 2015/0114492 A1 * | 4/2015 | Oksanen | G05D 7/03 137/487 |
| 2017/0108881 A1 | 4/2017 | Welch, II et al. | |

FOREIGN PATENT DOCUMENTS

| | | |
|---|---|---|
| CN | 102741627 A | 10/2012 |
| CN | 205036664 U | 2/2016 |
| DE | 33 05 093 A1 | 8/1984 |
| EP | 1853840 B1 | 2/2011 |
| EP | 3088779 A1 | 11/2016 |
| FR | 2 250 059 | 5/1975 |
| WO | 2011063375 A1 | 5/2011 |

OTHER PUBLICATIONS

"Capacity regulators (hot gas bypass) PMC and CVC" by Danfoss A/S, Technical brochure, Feb. 2013, pp. 1-12.

Indian First Examination Report for corresponding India Application No. 201611037311 dated Sep. 11, 2019.

International Search Report for Serial No. PCT/EP2017/077549 dated Jan. 24, 2018.

* cited by examiner

TOP COVER FOR A SOFT THROTTLING VALVE BODY, SOFT THROTTLING VALVE AND METHOD FOR ASSEMBLING A SOFT THROTTLING VALVE

CROSS-REFERENCE TO RELATED APPLICATIONS

This application is a National Stage application of International Patent Application No. PCT/EP2017/077549, filed on Oct. 27, 2017, which claims priority to India Patent Application No. 201611037311 filed Nov. 1, 2016; and European Patent Application No. 17165521.0, filed on Apr. 7, 2017, each of which is hereby incorporated by reference in its entirety.

TECHNICAL FIELD

The present invention relates to a top cover for a soft throttling valve body, the top cover comprising one or more fluid conduits for transferring a pilot fluid flow for setting a degree of opening of a main valve situated in the soft throttling valve body to the soft throttling valve body.

Furthermore, the present invention relates to a soft throttling valve comprising an inlet, an outlet, and a main valve having a valve seat between said inlet and said outlet, wherein the soft throttling valve is arranged for throttling the main valve in such a way that the pressure shock is reduced.

Additionally, the present invention relates to a method for assembling the soft throttling valve, the method comprising the step of mounting a follower arrangement being arranged to throttle the pilot fluid flow.

BACKGROUND

US 2006/0197041 A1 relates to a dual position pilot operated valve assembly. It is disclosed that said assembly comprises an adjustment mechanism controlling the degree of opening/closing of the valve assembly. The utilization of the dual position pilot operated valve assembly, by a reason of its opening and/or closing only partway, prevents or at least mitigates liquid hammer or vapor propelled liquid at the termination of a hot gas defrost step in a refrigeration cycle operation.

WO 2011/063375 A1 shows an adjustable fail-safe suction valve stop. This valve provides a hot gas defrost in refrigeration applications. Said valve includes a second piston reciprocable within a bore in an adapter body, the second piston having a portion adapted to extend into a bore in the valve body for contacting a first piston. The portion of the second piston may be axially adjustable to optimize the partial opening of the valve when the second piston is pushed fully downward towards the first piston.

U.S. Pat. No. 5,070,707 discloses a shockless system and hot gas valve for refrigeration and air conditioning. The shockless steal frost valve operated by solenoids is automatically self-controlled by the downstream pressure of the valve. When a valve opening is called for, a pilot solenoid valve opens a regulatory passage. The resistance of the regulatory passage to the hot gas flow reduces the pressure gradient of the flow and thus eliminates the possibility of a shock wave being propagated. When the downstream pressure due to the outlet pressure control of the evaporator increases to a pre-set value, a diaphragm driven by the controlled pressure from downstream moves and opens a passage for the gas from upstream of the valve to drive a power piston downward.

It is a known issue that an exact control of the degree of opening of the main valve in the soft throttling valve can be difficult. Sometimes such a control system for the pilot fluid flow may comprise many elements and thus may be complex and expensive. Thus, the control over the pilot fluid flow for setting the degree of opening of the main valve may be inadequate.

Furthermore, failures of the soft throttling valve, like sudden opening in a single step or insufficient draining of the main valve, may lead to valve damage.

SUMMARY

It is an object of the invention to provide the top cover for the soft throttling valve body, the soft throttling valve and the method for assembling the soft throttling valve which allow for good control of the pilot fluid flow for setting the degree of opening of the main valve situated in the soft throttling valve body while protecting the soft throttling valve from damage due to malfunction.

The object of the invention is solved by the top cover for the soft throttling valve as described in the outset in that the top cover comprises a follower arrangement arranged to throttle the pilot fluid flow, the follower arrangement being arranged to throttle the pilot fluid flow depending on the degree of opening of the main valve, the top cover further comprising a manual opening arrangement for manually opening the main valve and/or the top cover further being adapted to prevent a step-wise opening of the main valve in less than two opening steps.

Using the follower arrangement has the advantage that the pilot fluid flow may be automatically reduced when the degree of opening of the main valve reaches a predetermined value. Then, due to a reduced pressure increase, a further opening of the main valve may be prevented, so that the main valve maintains a partially opened position, thus, the degree of opening corresponds to between more than 0% of a maximum main fluid flow through the main valve and less than 100% of the maximum main fluid flow through the main valve. This allows having a step-wise opening of the main valve and a soft opening process wherein in a first step only a partial opening of the main valve occurs, and wherein in a later step a full opening of the main valve occurs. Likewise, such a soft throttling may be applied in a soft closing process, wherein in a first step a partial closure of the partial opening of the main valve occurs and in a second step a full closure of the main valve occurs.

By additionally providing a manual opening arrangement for manually opening the main valve and/or by additionally adapting the top cover to prevent the step-wise opening of the main valve in less than two opening steps damage caused by the main fluid flow may be prevented. When the manual opening arrangement is additionally provided, fluid caught in the soft throttling valve body may easily be drained by manually opening the main valve. Thus, it is prevented that fluid caught in the main valve body may expand over time and thus damages parts of the main valve body or elements fluidly connected to it. When the top cover is additionally adapted to prevent the step-wise opening of the main valve in less than two opening steps, pressure shocks due to failure of the soft throttling can be prevented. It is ensured that the opening of the main valve only occurs in two or more discrete opening steps with sudden pressure increase in a pressure chamber.

Thus, in view of the above, the top cover is provided with the follower arrangement as described. In addition to the follower arrangement, at least one of the manual opening arrangement and preventing the stepwise opening of the main valve in less than two opening steps is implemented. However, preferably both means are implemented in addition to having the follower arrangement.

Thus, by means of this aspect of the invention, good control of the degree of opening of the main valve of the soft throttling valve may be achieved while damage due to malfunction may be prevented.

Concerning the top cover, it is preferred that the manual opening arrangement is arranged to actuate a follower element of the follower arrangement so as to manually open the main valve. Preferably, the manual opening arrangement is arranged to push the follower element towards an outside directions of the top cover, preferably by 4 to 6 mm. Then the follower element may push a main valve element away from a main valve seat when the top cover is mounted to the soft throttling valve body. Thus, the manual opening arrangement is preferably arranged to translate the follower element in order to open the main valve. A preferred manual opening arrangement comprises a wrench connector or a turn knob. Furthermore, a preferred manual opening arrangement comprises a spindle. Preferably, the turn knob or the wrench connector are arranged on an end of the spindle. By turning the spindle the spindle may be translated so as to actuate the follower element. Preferably, the follower element is supported in a follower arrangement housing by means of a threaded connection. This allows easy and reliable opening of the main valve by agitating the spindle.

In the top cover, the manual opening arrangement preferably comprises the spindle collinearly arranged with the follower element, the spindle being arranged to actuate the follower element. Thus, it is preferred that a first end of the spindle is arranged to contact a first end of the follower element in order to translate the follower element. A second end of the follower element may then translate the main valve element.

Preferably, the manual opening arrangement and the follower arrangement are arranged in a stacked configuration. This configuration may be very compact as no additional mounting area on the top cover is needed for installing the manual opening arrangement. In embodiments, a stacked configuration means that the follower arrangement is arranged interposed between the manual opening arrangement and a top cover housing. The manual opening arrangement may by fixed permanently or removably to the follower arrangement. Preferably, the manual opening arrangement is connected to the follower arrangement housing via a threaded connection. However, a clip fit or a glued or welded connection are alternatives in other embodiments.

In a preferred embodiment, the manual opening arrangement and the follower arrangement form a common sub-assembly. This allows good integration and may protect the manual opening arrangement and the follower arrangement from unwanted external influences, like dirt or humidity. The manual opening arrangement and the follower arrangement may share a common housing. Thus, assembly of the top cover may be easy. While the sub-assembly may be integral, in embodiments, a manual opening arrangement housing and the follower arrangement housing are separate parts connected to each other so as to form a common sub-assembly.

It is preferred that the top cover comprises two or more pilot valves arranged in a common pilot fluid flow path through the top cover, the top cover being adapted to block the pilot fluid flow path between two of the pilot valves. This feature may be very advantageous for adapting the top cover to prevent a step-wise opening of the main valve in less than two opening steps. Preferably, two pilot valves are arranged in a serial configuration in the flow path. Thus, the pilot flow path passes through all of the valves sequentially. Preferably, if one of the pilot valves fails to open, the pilot fluid flow is terminated. No matter whether any other valve arranged further downstream of the failing pilot valve opens or not, no additional pilot fluid will be supplied to the main valve to be soft throttled. Sudden pressure increase is prevented and thus a risk of valve damage is decreased. Preferably, the pilot valves can be actuated, e.g. opened or closed, independently of each other.

Preferably, a pilot fluid flow passage is provided which fluidly connects a first pilot valve and a second pilot valve mounted to the top cover, the first pilot valve blocking the pilot fluid passage to the second pilot valve when the first pilot valve is in a closed state. Preferably, the first pilot valve is a solenoid valve. Preferably, the second pilot valve is a solenoid valve. This may be a very simple way to embody a solution for adapting to prevent a step-wise opening of the main valve in less than two opening steps. The first pilot valve, by design, blocks the pilot fluid flow path when it is in the closed state. It is preferred that a first pilot valve element comprises an outer surface which blocks a pilot gas flow path to the second pilot valve when the first pilot valve is in the closed state. Preferably, the first pilot valve element blocks a pilot gas outlet of the first pilot valve when the first pilot valve is in the closed state. However, in some embodiments, there is a pilot valve monitoring arrangement monitoring the opening state of one or more pilot valves, the pilot valve monitoring arrangement being adapted to actuate a blocking element separate from one or more pilot valve elements so as to block the pilot fluid flow path when it detects that one or more of the pilot valves failed to open. Then the blocking may occur in another section of the pilot fluid flow path, remote from the pilot valve being in the closed state.

Preferably, the top cover is adapted to provide a protected soft open operation mode and a non-protected soft open operation mode. A protected soft open operation mode is an operation mode where opening the main valve in less than two steps is prevented. Consequently, a non-protected soft open operation mode is an operation mode when opening the main valve in two or more steps is preferred, although an opening in less than two steps is not prevented and thus possible. The top cover can preferably provide both modes. Thus, when a valve user does not intend to use the protected mode, the valve may be configured to provide the non-protected mode and vice versa. Thus, the same top cover can be provided for both user interests.

It is preferred that the top cover comprises three or more pilot valve sockets. A first pilot valve socket for receiving a pilot valve may be in fluid communication with a main valve inlet when the top cover is attached to a soft throttling valve housing. A second pilot valve socket for receiving a pilot valve may be in fluid communication with the first pilot valve socket. A third pilot valve socket may be in fluid communication with the main valve inlet when the top cover is attached to a soft throttling valve housing. The first pilot valve socket may be designated as S-I. The second pilot valve socket may be designated as S-II. The third pilot valve socket may be designated as P. Preferably, a first pilot valve is installed in S-I. A second pilot valve is preferably installed in S-II. In alternatives, the second pilot fluid flow may be installed in P. S-I is preferably supplied with pilot gas directly from the main valve inlet. When the first pilot valve installed in S-I opens, pilot valve is supplied to S-II, when the second pilot valve is installed in S-II, and to the follower arrangement. The pilot gas supplied with the pilot fluid flow partially opens the main valve and the follower arrangement follows the degree of opening of the main valve. The follower arrangement follows the position of the main valve element at least in a predetermined movement range. The top cover is adapted to keep the main valve in an intermediate degree of opening until the second pilot valve is opened. When the second pilot valve opens, the pilot fluid flow increases and the main valve fully opens accordingly. Thus, a two-step opening is provided. On the other hand, if due to a malfunction the first pilot valve fails to open, the second pilot valve is not supplied with pilot gas as the first pilot valve blocks the fluid flow path. Thus, even if the second pilot valve opens as planned, as no pilot gas is present at S-II, the main valve element will not open, thus preventing a sudden full opening of the main valve from the fully closed state. The operation mode just described is a preferred protected soft open operation mode.

For a preferred non-protected soft open operation mode, the second pilot valve is arranged in the third pilot valve socket instead of the second pilot valve socket. As both, the first pilot valve socket and the second pilot valve socket are fluidly connected directly to the main valve inlet, the first pilot valve and the second pilot valve independently may supply pilot fluid for opening the main valve. If the first pilot valve is opened, the main valve is partially opened and remains in the partial open state due to the follower arrangement. When the second pilot valve is opened, the main valve is fully opened as the second pilot valve does not supply the pilot fluid via the follower arrangement but directly to the main valve element. However, if the first pilot valve fails to open, the main valve element will translate to the fully opened state directly from the fully closed state once the second pilot valve opens. Thus, opening the main valve occurs in a single step. Therefore, damage in case of failure of the first pilot valve to open will not be prevented. That's why this operation mode is called non-protected soft open operation mode. Which of the modes is provided therefore just depends on whether the second pilot valve is arranged in the second pilot valve socket, which allows to provide the protected soft operation mode, or the second pilot valve is arranged in the third valve pilot socket, which allows to provide the non-protected soft open operation mode. The remaining of the three pilot valve sockets in any mode is closed by means of a first plug and the flow path to the remaining of the three valve sockets is closed by a second plug. Thus, function of the remaining, thus not used, pilot valve socket is deactivated.

Preferably, the follower arrangement comprises a biasing element and a follower element, the biasing element biasing the follower element so as to reduce the pilot fluid flow through the top cover. Furthermore, it is preferred that the follower arrangement has an orifice and the follower arrangement is arranged to reduce to pilot fluid flow through the orifice. It is preferred that the biasing element biases the follower element towards the orifice. Preferably the follower arrangement has the follower element which is arranged to be attached to the main valve element of the main valve. Furthermore, in a preferred embodiment, the follower element is arranged to mechanically sense the position of the main valve.

Preferably, the follower arrangement comprises the follower element which comprises the fluid conduit, the follower element comprising an inlet orifice and an outlet orifice for passing the pilot fluid flow through the fluid conduit of the follower element. This solution allows a compact and tightly sealed embodiment of the top cover.

The pilot fluid flow from the first pilot valve to the main valve element may pass through the follower element. Thus, an additional orifice passing through the follower arrangement housing may be omitted. The inlet orifice may be arranged such that depending on a translational state of the follower element, the inlet orifice is blocked, preferably by the follower arrangement housing. A predetermined translational state of the follower arrangement corresponds to a predetermined opening state of the main valve, preferably. Preferably, the predetermined opening state of the main valve when the first pilot valve is in an opened state corresponds to 10 to 15% of a maximum fluid flow through the main valve, preferably 14%. In the preferred opening state of the main valve the inlet orifice of the follower element is shut and the pilot fluid flow to the main valve stops. As pilot fluid slowly drains from a pressure chamber driving the main valve element, after a predetermined amount of time, the main valve element will slowly translate backwards toward the closed position. Then the follower element will also translate backwards into the top cover. Thus, the inlet orifice will be unblocked and further pilot gas will be supplied to the pressure chamber through the follower element. This way, the main valve will undulate around a predetermined partial opening state until either the first pilot valve is closed or the second pilot valve is opened. In the first case, the main valve will move back to the closed state, while in the latter case the main valve will fully open. Thus, having the follower element gives a very simple and self-controlling top cover for a soft throttling valve body.

It is preferred that the follower arrangement comprises a biasing element extending over on an outer surface of the top cover. In some embodiments, this allows a very good following of the main valve element without having to mount the biasing element inside the fluid flow passage in the follower arrangement housing. Thus, the biasing element will not affect the pilot fluid flow inside the follower arrangement housing. This may reduce noise. Preferably, the biasing element is supported on an outside surface of a bush closing the follower element housing. Preferably, the bush forms a lower wall of the follower arrangement housing and the biasing element is supported on an outer surface of the bush, the outer surface facing away from the follower arrangement housing. It is furthermore preferred that the biasing element surrounds the follower element. Preferably, the biasing element is a coil spring. The biasing element is preferably supported on a shoulder arranged at an end of the follower element facing away from the top cover.

A preferred follower arrangement comprises a connection zone for connecting the follower arrangement to the main valve. If the follower arrangement, specifically the follower element, is connected to the main valve, specifically to the main valve element, more specifically to a piston plate of the main valve element, the follower element may reliably follow the position of the main valve element. The connection zone may be an end of the follower element comprising locking means, preferably one or more balls of a ball locking mechanism. Then a ball locking retainer is arranged at the main valve element of the soft throttling valve, the locking retainer being adapted to interlock with the end of the follower element comprising the one or more balls.

Furthermore, the object of the invention is solved by the soft throttling valve as described in the outset, the soft throttling valve comprising a follower arrangement arranged to throttle the pilot fluid flow, the follower arrangement being arranged to throttle the pilot fluid flow depending on a degree of opening of the main valve, the soft throttling valve further comprising a manual opening arrangement for manually opening the main valve and/or the soft throttling valve being adapted to prevent a step-wise opening of the main valve in less than two opening steps.

The advantages of the proposed solution have been described above in view of a top cover. The good control of the state of opening of the main valve is reached while preventing valve damage in case of malfunction.

Preferably, the manual opening arrangement of the soft throttling valve is arranged to actuate a follower element of the follower arrangement so as to manually open the main valve. Reference is made to the description in view of the top cover as given above.

Furthermore, the soft throttling valve preferably comprises two or more pilot valves arranged in the common pilot fluid flow path through the soft throttling valve, the soft throttling valve being adapted to block the pilot fluid flow path between two of the pilot valves. Reference is made to the description of the top cover as given above. Preferably, the pilot valves can be actuated, e.g. opened or closed, independently of each other.

It is preferred that the soft throttling valve comprises the soft throttling valve body and the top cover, the top cover being preferably the top cover as described above. This allows providing the soft throttle operation mode to the soft throttling valve.

Additionally, the object of the invention is solved by the method for assembling the soft throttling valve as described in the outset which comprises the step of mounting the manual opening arrangement to the follower arrangement, the manual opening arrangement being adapted to manually open the main valve situated in the soft throttling valve body.

This way a compact construction of the soft throttling valve is possible. The manual opening arrangement may be stacked on the follower arrangement. The follower arrangement may be stacked on the top cover. Preferably, the follower arrangement housing is provided. It is preferred to assemble a bush which may be a cast iron bush into the follower arrangement housing. It is furthermore preferred to assemble the biasing element and the follower element which may be the coil spring and the needle, respectively into the follower arrangement housing. The manual opening arrangement may be assembled onto the follower arrangement housing to form a common sub-assembly. The sub-assembly of the manual opening arrangement and the follower arrangement may be mounted onto the top cover. The mentioned assembly steps may be performed in the given sequence. However, the assembly steps may also be rearranged in order to improve convenience.

BRIEF DESCRIPTION OF THE DRAWINGS

In the following, the invention is described in view of exemplary embodiments provided in the attached figures, in which.

Figure 1:
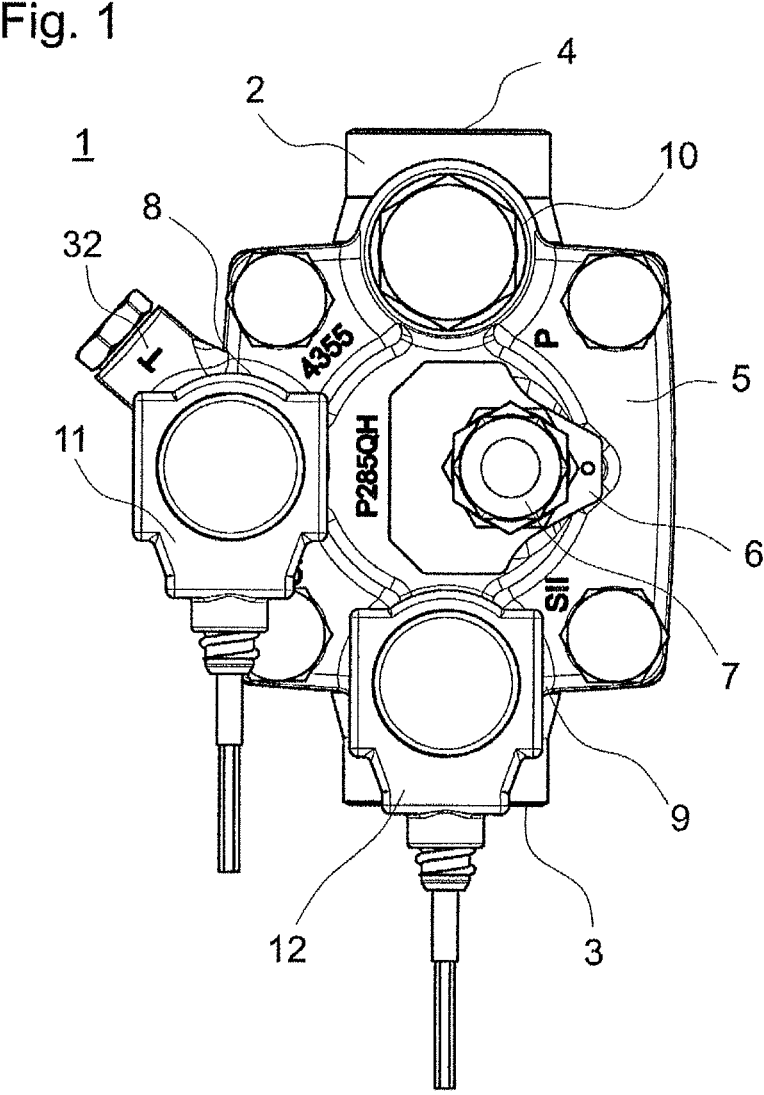
FIG. 1 shows a top view of a soft throttling valve and a top cover for a soft throttling valve body according to a first embodiment of the invention.

Reference numerals are introduced into the detailed description of embodiments following hereafter. They are meant for increasing the readability of the claims and the description and are in no way limiting. Features of the different embodiments may be freely combined with each other and with any of the features described above.

DETAILED DESCRIPTION

FIG. 1 shows a top view of a soft throttling valve 1. The soft throttling valve 1 comprises a soft throttling valve body 2. The soft throttling valve 1 furthermore comprises an inlet 3 and an outlet 4. The inlet 3 and the outlet 4 are arranged in the soft throttling valve body 2. The soft throttling valve body 2 is covered by a top cover 5. The top cover 5 comprises a number of fluid conduits (not shown in FIG. 1) for transferring a pilot fluid flow to the soft throttling valve body 2.

The top cover 5 as shown in FIG. 1 comprises a follower arrangement 6. The follower arrangement 6 is arranged to throttle the pilot fluid flow. Furthermore, the top cover 5 and thus the soft throttling valve 1 comprises a manual opening arrangement 7. Its function will be described in more detail later. As can also be seen in FIG. 1, the manual opening arrangement 7 and the follower arrangement 6 are arranged in a stacked configuration.

As can further be seen in FIG. 1, the top cover 5 comprises a first pilot valve socket 8 which is designated as S-1 in this embodiment. Furthermore, the top cover 5 comprises a second pilot valve socket 9, which is designated as S-2 in the present embodiment. Lastly, the top cover 5 comprises a third pilot valve socket 10 designated as P in this embodiment.

A first pilot valve 11, in this embodiment a first solenoid valve, is arranged in the first valve socket 8. A second pilot valve 12, in this embodiment a second solenoid valve, is arranged in the second valve socket 9. A plug is arranged in the third pilot valve socket 10 so as to seal a third pilot valve socket as the third pilot valve socket 10 is not in use in this embodiment.

By having three pilot valve sockets 8, 9, 10, the top cover 5 and thus the soft throttling valve 1 are adapted to provide a protected soft operation mode and a non-protected soft operation mode. The meaning of this will become clearer in view of the following figures. In the embodiment described in view of FIG. 1, the protected soft operation mode is said active, preventing a step-wise opening of the main valve in less than two opening steps.

Figure 2:
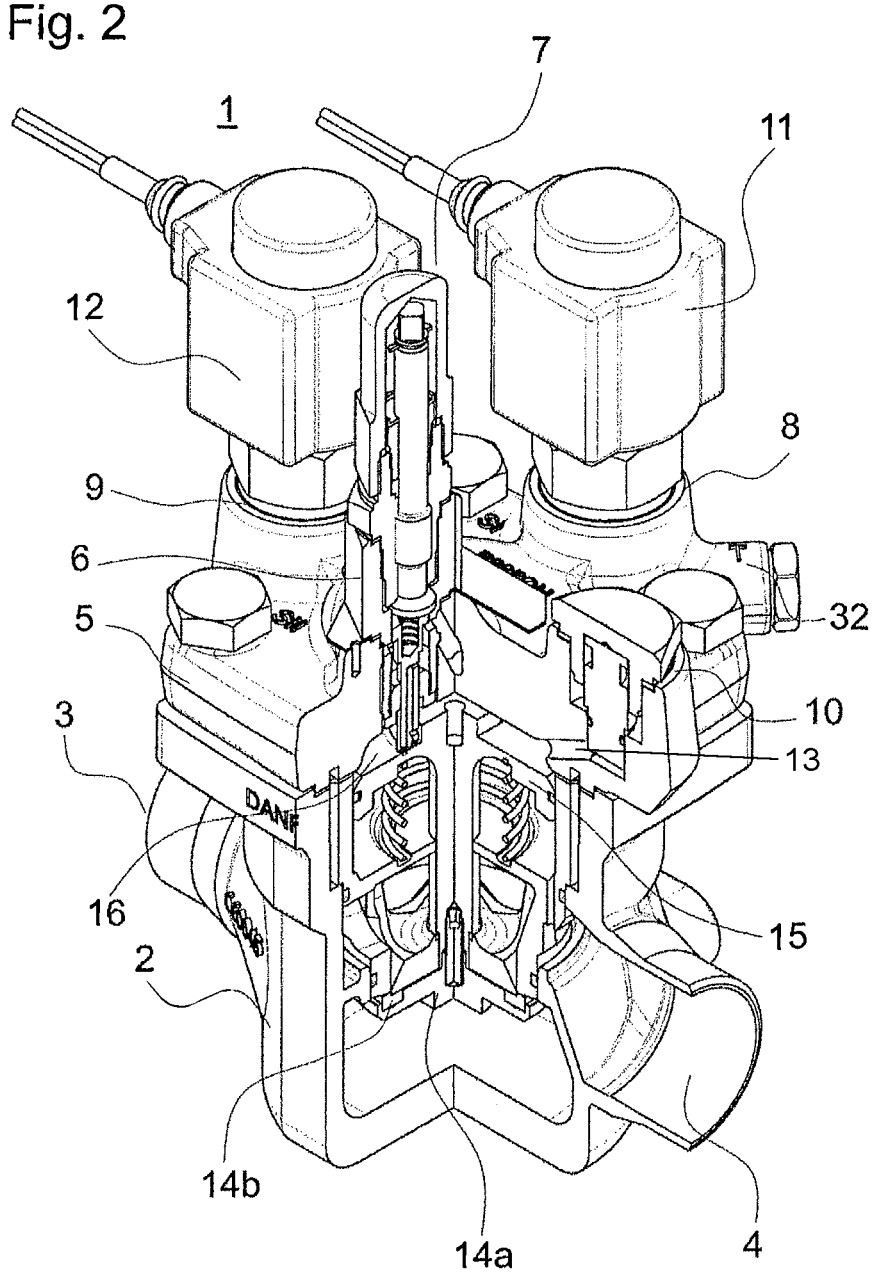
FIG. 2 shows a perspective sectional view of the first embodiment.

As may be seen in FIG. 2, the top cover 5 comprises a first fluid conduit 13 for transferring the pilot fluid flow to a main valve situated in the soft throttling valve body 2. The main valve has a main valve element 14a and a main valve seat 14b. The main valve seat 14b is arranged between the inlet 3 and the outlet 4. The main valve element 14a comprises a piston plate 15 translatable arranged in a pressure chamber 16 formed by the top cover 5 and the main valve body 2. By feeding the pilot fluid flow into the pressure chamber 16, for example via the first fluid conduit 13, a chamber pressure is increased which translates the piston plate towards the valve seat 14b and the main valve element 14a away from the valve seat 14b. When the chamber pressure decreases again, by pilot gas bleeding from the pressure chamber 16, the main valve element 14a moves backwards onto the main valve seat 14b, closing the main valve due to a mechanical presetting pressure.

In the first embodiment, as shown in FIG. 2, the soft throttling valve 1 is a two-step opening valve. Thus, the first pilot valve socket 8 is arranged so as to receive the pilot fluid flow, in this embodiment for example a flow of hot gas with a temperature above 100° C., from the inlet 3 of the soft throttling valve body 2 via fluid conduits in the top cover 5. When the first pilot valve 11 opens, the pilot fluid flow is passed through the first pilot valve 11 to the pressure chamber 16 via the follower arrangement 6. The pressure in the pressure chamber 16 therefore increases and this pressure increase opens the main valve partially in a first opening step. In this embodiment, in the first opening step, a flow rate of 10 to 15% of the maximum possible flow rate through the main valve, preferably 14%, is set for a predetermined time, for example 2 to 5 minutes, preferably 3 minutes, as will be described in more detail later. Then the second pilot valve 12 is opened and supplies further pilot fluid into the pressure chamber 16. The further pilot fluid flow is supplied to the pressure chamber 16 directly, without going through the follower arrangement 6. This way, in a second opening step, the further pilot fluid flow opens the main valve to 100% of the maximum flow. The pilot valve 11, 12 can preferably be actuated independently of each other.

However, according to this embodiment, the soft throttling valve 1, more specifically the top cover 5, is adapted to prevent a step-wise opening of the main valve in less than two opening steps. Therefore, the top cover comprises the first pilot valve 11 and the second pilot valve 12 arranged in a common pilot fluid flow path through the top cover 5, the top cover 5 being adapted to block the pilot fluid flow path between the first pilot valve 11 and the second pilot valve 12. More specifically, the top cover 5 comprises a pilot fluid flow passage connecting the first pilot valve 11 and the second pilot valve 12 mounted to the top cover 5, the first pilot valve 11 blocking the pilot fluid passage to the second pilot valve 12 when the first pilot valve 11 is in a closed state. This follows more clearly from later figures. Thus, in case the first pilot valve 11 does not open due to a malfunction, the second pilot valve 12 will lack the pilot fluid flow to pass to the pressure chamber 16. Therefore, even if the second pilot valve 12 opens, no further pilot fluid flow will be passed to the pressure chamber 16, thus preventing a step-wise opening of the main valve in less than two opening steps and the main valve is throttled such that a pressure shock is reduced. Damage to the soft throttling valve is therefore prevented.

Figure 3:
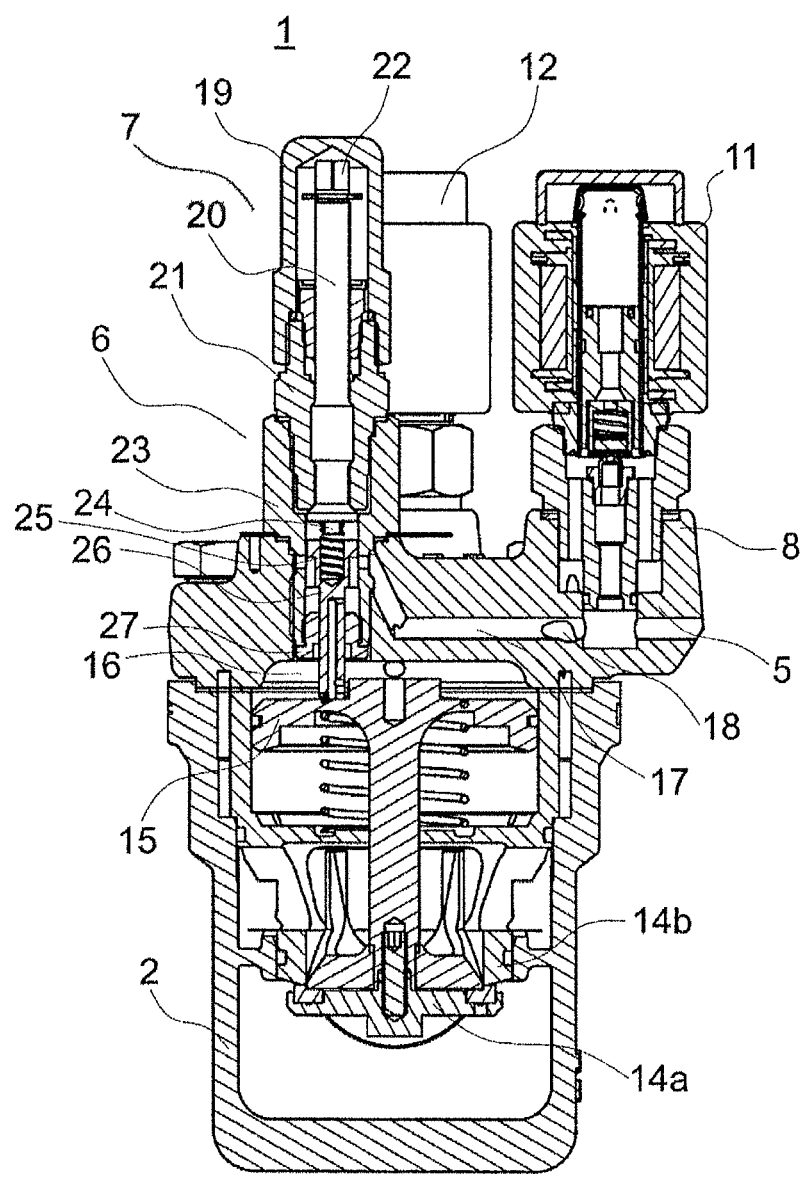
FIG. 3 shows a longitudinal section of the first embodiment.

FIG. 3 shows more details of the first embodiment. As shown, a second fluid conduit 17 fluidly connects the first pilot valve 11 and the follower arrangement 6. A third fluid conduit 18, which is the pilot fluid passage, departs from the second fluid conduit 17 fluidly connecting the first pilot valve 11 and the second pilot valve 12 mounted to the top cover 5, the first pilot valve 11 blocking the pilot fluid passage to the second pilot valve 12 when the first pilot valve 11 is in a closed state. In FIG. 3, the first pilot valve 11 is in an opened state. Thus, pilot fluid flow through the second fluid conduit 17 and the third fluid conduit 18 is possible. Therefore, pilot gas may reach the pressure chamber 16 via the follower arrangement 6. When the second pilot valve 12 opens, pressure gas will be supported via the third fluid conduit 18 and will directly be fed from the second pilot valve 12 to the pressure chamber 16 via the further fluid conduit from the second valve socket 9 so as to fully open the main valve.

However, when the first pressure valve 11 remains in the closed state, it blocks the pilot flow path, the third fluid conduit 18, to the second pilot valve 12. Then the pressure chamber 16 will not receive any pilot gas at all and thus the main valve will remain fully closed. A step-wise opening of the main valve in less than two opening steps is thus successfully prevented.

Furthermore, FIG. 3 reveals more detail about the manual opening arrangement 7. The manual opening arrangement 7 comprises a removable cover 19. The cover 19 covers a spindle 20 which is further housed in a movable opening arrangement housing 21 in a rotatable manner via a threaded connection. The spindle 20 comprises a wrench connection 22 at an end surrounded by the cover 19. Therefore, after removing the cover 19, the wrench connection may be used to manually rotate the spindle 20 in relation to the follower arrangement 6 so as to translate the spindle 20. The follower arrangement 6 comprises a follower arrangement housing 23. The follower arrangement housing 23 is mounted to the manual opening arrangement housing 21. Therefore, the manual opening arrangement 7 and the follower arrangement 6 are arranged in a stacked configuration. As can be seen, the manual opening arrangement 7 and the follower arrangement 6 form a common sub-assembly.

Figure 4:
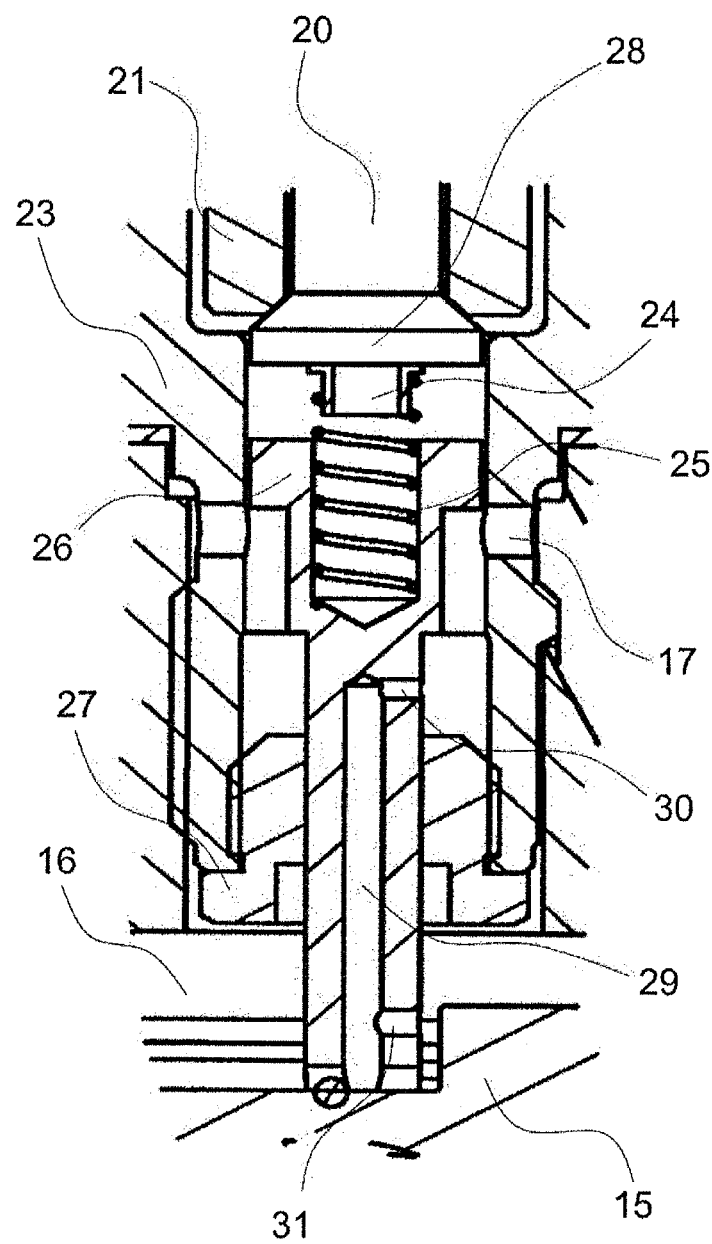
FIG. 4 shows a detail view of a follower arrangement applied in the first embodiment.

As can be seen in FIG. 4 more clearly, the spindle 20 comprises a first bush 24 for laterally stabilizing a biasing element 25, in this embodiment a coil spring, biasing a follower element 26, in this embodiment a needle. The follower arrangement housing 23 has an end which is distant from the spindle 20 and which is terminated by a second bush 27. The follower element 26 passes through the second bush 27 into the pressure chamber 16, the follower element 26 being in contact with the piston plate 15.

When the piston plate 15 moves in the pressure chamber 16, the needle follows the translational movement of the piston plate 16 due to the force exerted by the biasing element 25 which is supported in a cavity of the follower element 26. As can be seen, the manual opening arrangement 7 is arranged to actuate the follower element 26 of the follower arrangement 6 so as to manually open the main valve. To achieve this, the manual opening arrangement 7 comprises the spindle 20 collinearly arranged with the follower element 26, the spindle 20 being arranged to actuate the follower element 26. By manually rotating the spindle 20 it translates towards the follower element 26, thus pushing the follower element 26 towards and onto the piston plate 16. The piston plate 16 then moves away from the top cover and thus the main valve element 14a moves away from the valve seat 14b. This way, it is easy to manually open the main valve using the manual opening arrangement 7 arranged in a stacked configuration with the follower arrangement 6.

As FIG. 4 reveals, the follower arrangement 26 comprises a further fluid conduit 29. Furthermore, the follower element 26 comprises an inlet orifice 30 and an outlet orifice 31 for passing the pilot fluid flow through the fluid conduit 29 of the follower element 26.

Therefore, the pilot fluid flow reaching the follower arrangement 6 through the second fluid conduit 17 from the first pilot valve 11 can easily pass through the interior of the follower element 26 to the pressure chamber 16.

At a predetermined hub length, the second bush 27 will cover the inlet orifice 30, thus stopping the pilot fluid flow to the pressure chamber 16. The pilot fluid will successively bleed from the pressure chamber 16 through a bleed hole (not shown) in the piston plate 15 so that the main valve will close again and push back the follower element 26 towards the first bush 24. The inlet orifice 30 will be uncovered again, resuming the transfer of pilot fluid flow through the follower element 26. Thereby a predetermined degree of opening of the main valve is set, for example 14%. After some minutes, preferably 2 to 5 minutes, the second pilot valve 12 is opened, receiving pilot fluid flow from the first pilot valve socket 8 via the third fluid conduit 18. The pilot fluid flow from the second pilot valve 12 is then directly supplied to the pressure chamber 16, thus opening the main valve to 100% by suddenly increasing the pressure in the pressure chamber 16 in the second opening step.

Figure 5:
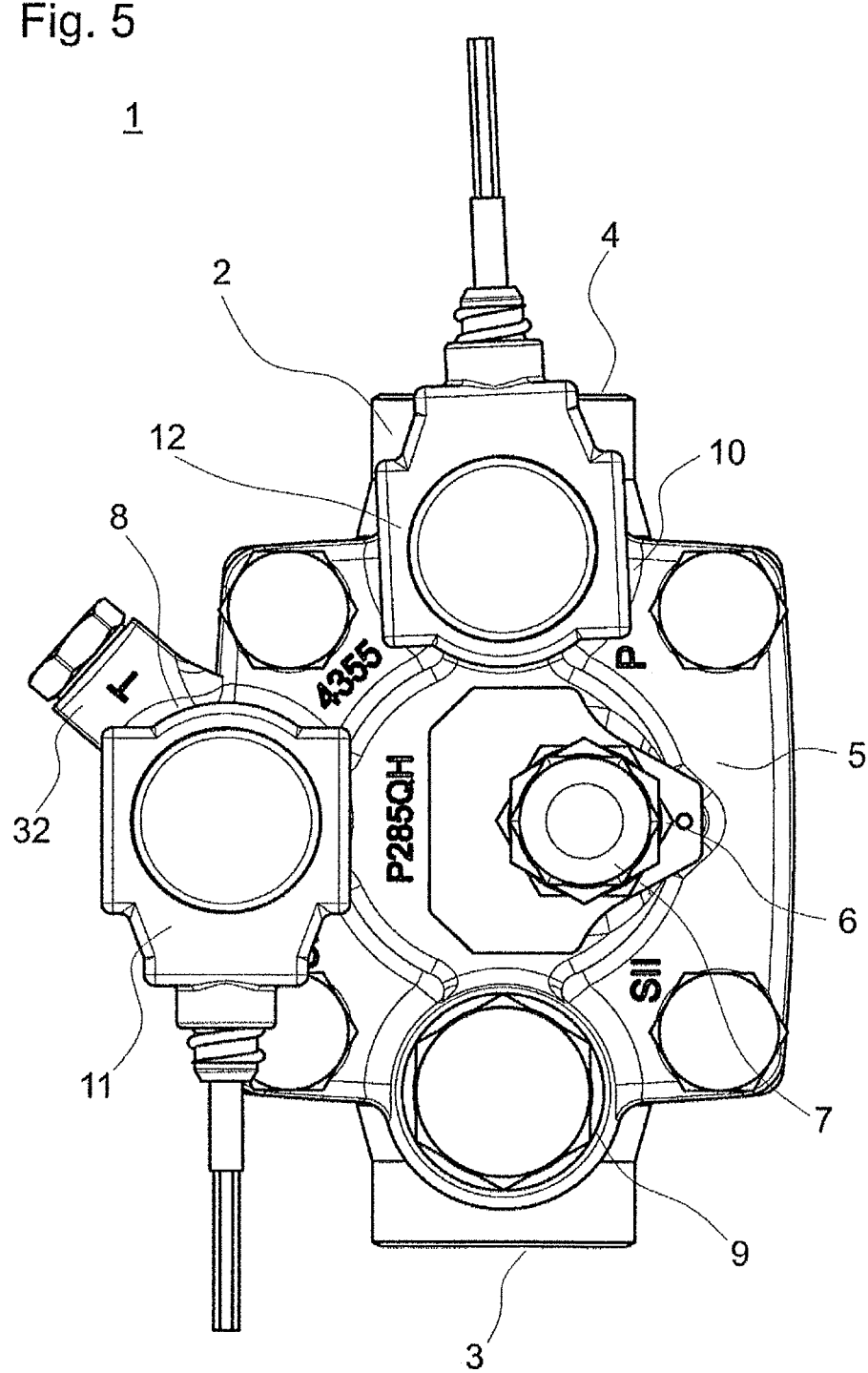
FIG. 5 shows a top view of a soft throttling valve and a top cover for a soft throttling valve according to a second embodiment of the invention.

FIG. 5 shows a second embodiment according to the invention. Here, the second pilot valve 12 is installed in the third pilot valve socket 10, designated as P. As the second pilot valve socket 10 is directly fluidly connected to the inlet 3 of the soft throttling valve body 2 and to the pressure chamber 16, the main valve will be fully opened when the second pilot valve 12 is opened, regardless of the opening state of the first pilot valve 11 in the first pilot valve socket 8. Thus, the soft throttling valve 1 is operated in the non-protected soft open operation mode, in contrast to the embodiment shown in FIGS. 1 to 4.

It becomes clear that changing between the two operating modes just involves changing the second pilot valve 12 from the second pilot valve socket 9 to the third pilot valve socket 10 or vice versa and terminating the respective unused socket 9, 10 and its ducts with plugs. Therefore, both operating modes may be offered with the same soft throttling valve 1 or top cover 5, being easily reconfigurable.

Figure 6:
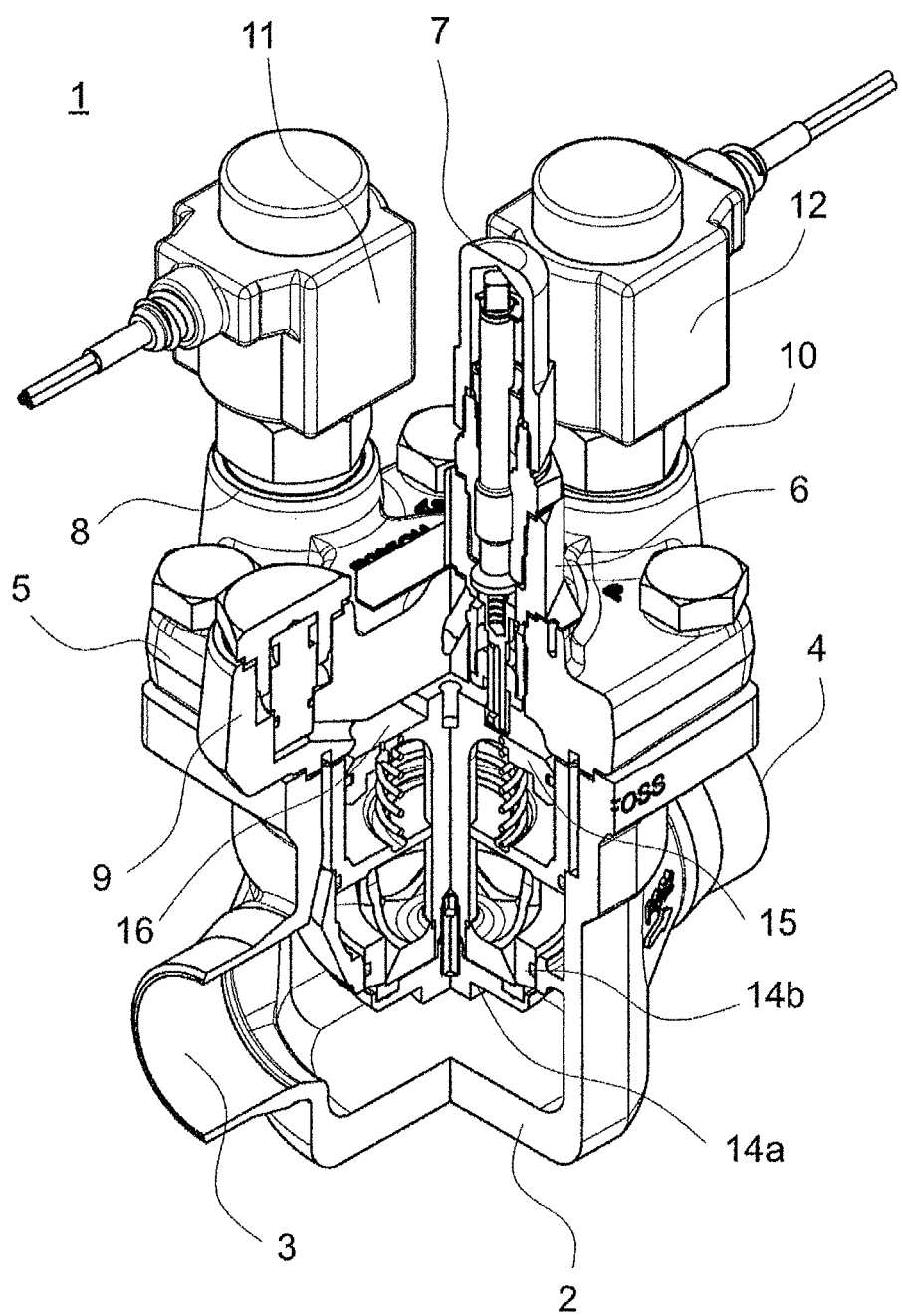
FIG. 6 shows a perspective sectional view of the second embodiment.

FIG. 6 shows the embodiment according to FIG. 5 in a partial longitudinal section. Reference to FIG. 2 is herewith made for the constructional details. As in FIG. 2, FIG. 6 depicts a state in which the main valve is fully closed.

Figure 7:
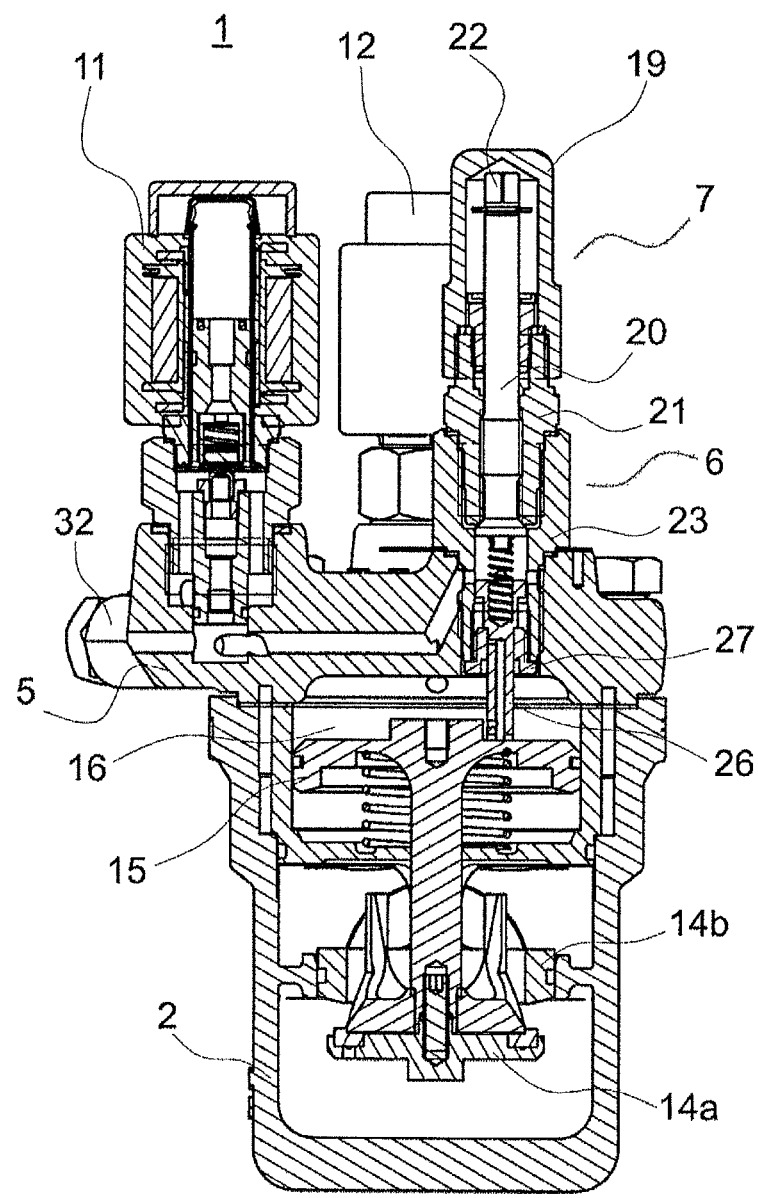
FIG. 7 shows a longitudinal section of the second embodiment.

FIG. 7 now shows the embodiment according to FIGS. 5 and 6 in a first opening step in which the main valve is opened for a flow of 14% of the maximum possible flow through the main valve. The features are comparable to the ones described in view of FIG. 3. Therefore, reference is made to this part of the description. However, an important difference lies in the translational position of the follower element 26, as will be understood in view of FIG. 8.

Figure 8:
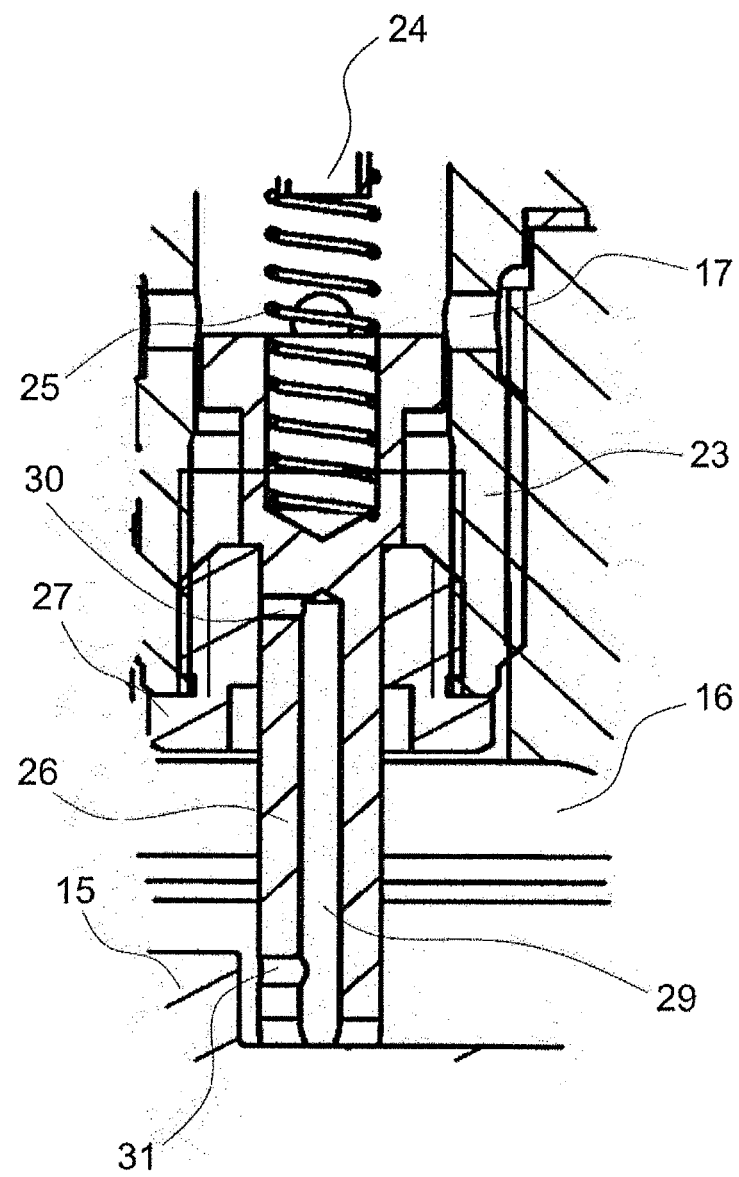
FIG. 8 shows a detail view of a follower arrangement applied in the second embodiment.

As shown in FIG. 8, when the soft throttling valve 1 is in the first, partial opening step, the inlet orifice 30 of the follower element 26 is blocked by the follower arrangement housing 23, preferably by the second bush 27 as shown in this embodiment. Therefore, the pilot fluid flow to the pressure chamber 16 is interrupted, preventing further pressure increase. The main valve element is effectively kept in an intermediate opening state between 0% and less than 100% for example 14%.

Furthermore, as shown in the figures, the top cover 5 may comprise an auxiliary port 32 for external gas supply. This may be useful, for example, when having multiple main valves combined in a system.

Figure 9:
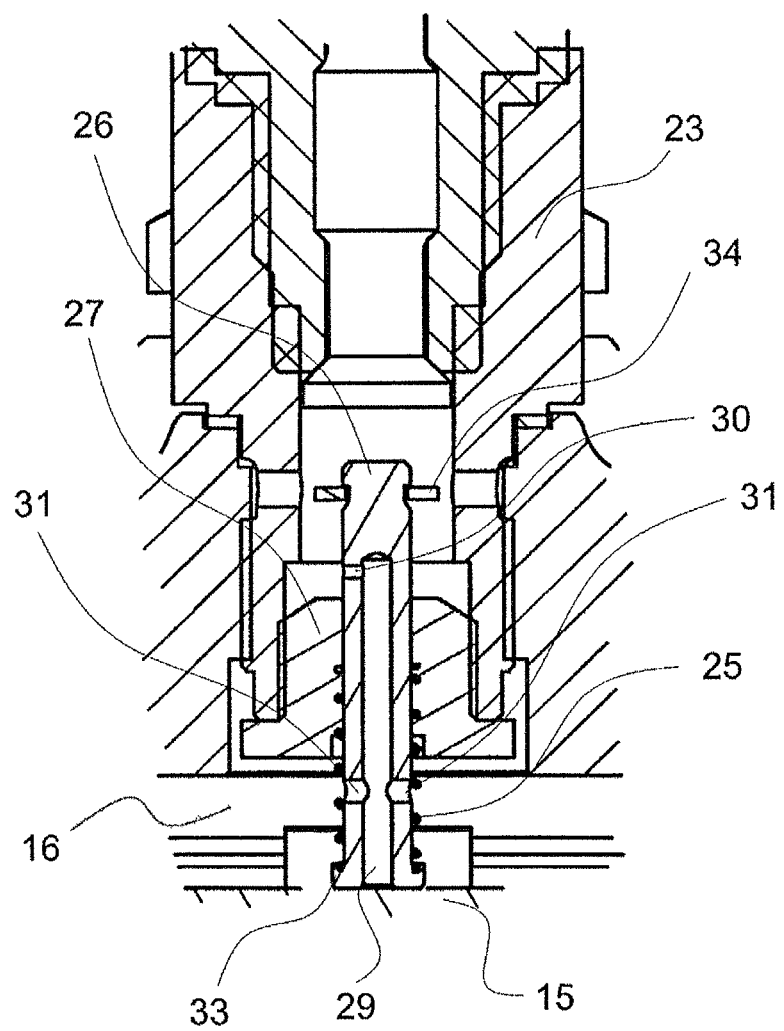
FIG. 9 shows an alternative follower arrangement in an embodiment of the invention.

FIG. 9 shows an alternative follower arrangement 6 in embodiments of the invention. For example, such an alternative follower arrangement 6 may be used in the first or second embodiment of the invention. The follower element 26 comprises a shoulder 33 at its end facing away from the top cover 5. The shoulder 33 supports the biasing element 25. Furthermore, the second bush 27 supports the biasing element 25. More specifically, the second bush 27 supports the biasing element 25 on an outer surface facing away from the follower arrangement housing 23. Therefore, the biasing element 25 is no longer arranged inside of the follower arrangement housing 23. Thus, as the biasing element 25 does not interfere with the pilot fluid flow inside of the follower arrangement housing 23, noise is reduced.

A circlip 34 is mounted at an end of the follower element 26 arranged inside of the follower arrangement housing 23. The circlip 34 is arranged so as to prevent loss of the follower element 26 from the follower arrangement housing 23 by interacting with the follower arrangement housing 23, preferably the second bush 27. More specifically, the circlip 34 is arranged to interact with a surface of the second bush 27 facing towards the inside of the follower arrangement housing 23. As in the first and the second embodiment, the inlet orifice 30 and the outlet orifice 31 are arranged perpendicular to the extension direction of the fourth fluid conduit 29. However, in the alternative shown in FIG. 9, the follower element 26 comprises two outlet orifices 31 facing in opposite directions. This may improve pilot valve flow distribution in the pressure chamber 16.

Figure 10:
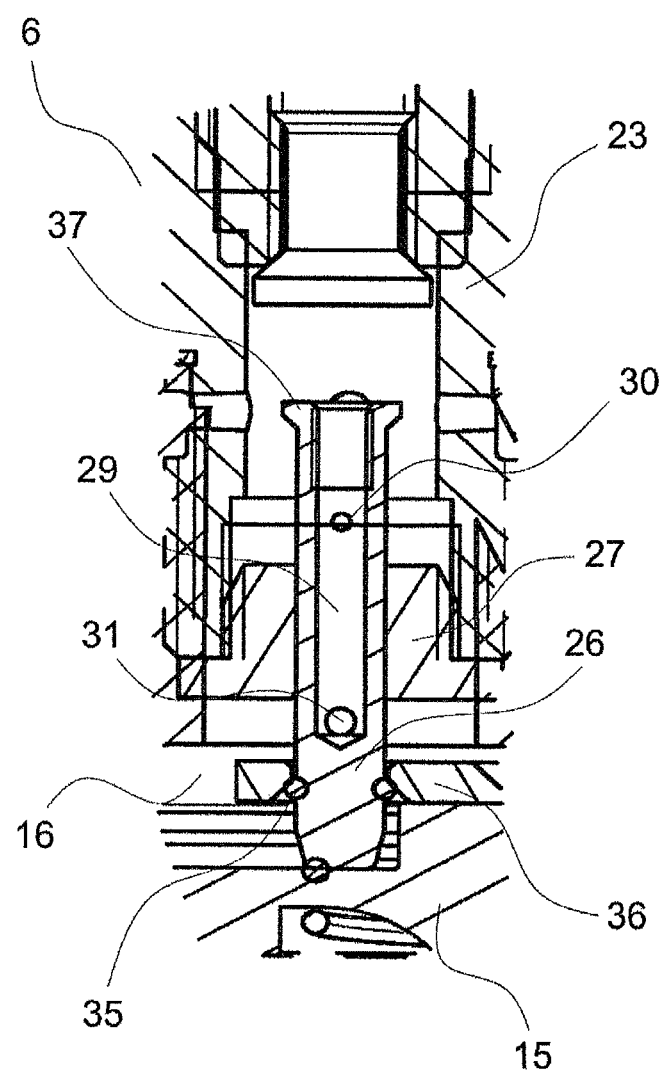
FIG. 10 shows a yet alternative follower arrangement in an embodiment of the invention.

FIG. 10 shows a yet further alternative of the follower arrangement 6 which is used in some embodiments of the invention. It may, for example, be used in the first or the second embodiment as described above by replacing their respective follower arrangements 6 used in those embodiments. According to the yet further alternative, the follower element 26 is fixedly attached to the piston plate 15. This allows to omit the biasing element 25, thus reducing complexity of the follower arrangement 6. Nevertheless, due to the fixed attachment, the follower element 26 may reliably follow the main valve depending on the state of opening of the main valve.

More specifically, according to FIG. 10, the follower element 26 is fixedly attached to the piston plate 15 by means of a ball locking mechanism. The follower element 26 comprises a number of balls 35, in this embodiment two, partially extending over a radial surface of the follower element 26. The balls 35 are arranged to interlock with a retainer plate 36 fixedly attached to the piston plate 15, the retainer plate 36 providing a rim radially surrounding the follower element 26. As shown in this embodiment, the follower element 26 is secured against loss to the follower arrangement 6 by means of a shoulder 37 arranged at the end of the follower element 26 opposite to the end contacting the piston plate 15. As in the other embodiments, the second bush 27 coaxially surrounds the follower element 26 which is translatably arranged in a bore of the second bush 27 and passes through the second bush 27. Thus, the shoulder 37 interacts with the second bush 27 so as to prevent the follower element 26 to slide out of the second bush 27 and thus out of the follower arrangement housing 23. Furthermore, an inlet orifice 30 has a smaller flow cross section than the outlet orifice 31. This can advantageously influence the pilot fluid flow through the fourth fluid conduit 29 passing through the follower element 26.

As is easily understood, a method for assembling the described soft throttling valve, the method comprising the step of mounting the follower arrangement 6 being arranged to throttle the pilot fluid flow, is improved by having the step of mounting the manual opening arrangement 7 to the follower arrangement 6, the manual opening arrangement 7 being adapted to manually open the main valve situated in the soft throttling valve body 2. The follower arrangement 6 and the manual opening arrangement 7 can thus be easily brought in a stacked configuration and mounted to the top cover 5 as a common sub-assembly.

As described above in detail, the embodiments provide a top cover 5 for the soft throttling valve body 2, the top cover 5 comprising one or more fluid conduits for transferring the pilot fluid flow for setting the degree of opening of the main valve situated in the soft throttling valve body 2 to the soft throttling valve body 2, the top cover 5 comprising a follower arrangement 6 arranged to throttle the pilot fluid flow, the follower arrangement 6 being arranged to throttle the pilot fluid flow depending on the degree of opening of the main valve, the top cover further comprising a manual opening arrangement for manually opening the main valve and/or the top cover 5 further being adapted to prevent a step-wise opening of the main valve in less than two opening steps. The same goes for soft throttling valve 1 comprising an inlet 3 and an outlet 4 and a main valve having a valve seat between said inlet 3 and said outlet 4 wherein the soft throttling valve 1 is arranged for throttling the main valve in such a way that a pressure shock is reduced, mutatis mutandis. This way, residual fluid can be easily drained from the soft throttling valve body 2 before the fluid expands and may damage the soft throttling valve 1. Furthermore, opening the main valve in a single step is prevented, thus a two or more step opening is ensured as the pilot valves are arranged in a serial manner in a pilot fluid flow path, allowing opening of the main valve only in two or more opening steps. Thus, pressure shock is reduced and damage prevented.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A top cover for a soft throttling valve body, the top cover comprising
    one or more fluid conduits for transferring a pilot fluid flow for setting a degree of opening of a main valve situated in the soft throttling valve body to the soft throttling valve body, wherein
    the top cover comprises a pilot arrangement arranged to throttle the pilot fluid flow, the pilot arrangement being arranged to throttle the pilot fluid flow depending on the degree of opening of the main valve, wherein the top cover comprises at least two pilot valves wherein a first pilot valve can be opened in a first step and a second pilot valve can then be opened in a second step and the top cover further comprises a manual opening arrangement for manually opening the main valve and/or the top cover being adapted to prevent a step-wise opening of the main valve in less than two opening steps.

2. The top cover according to claim 1, wherein the manual opening arrangement is arranged to actuate a pilot element of the pilot arrangement so as to manually open the main valve.

3. The top cover according to claim 2, wherein the manual opening arrangement comprises a spindle collinearly arranged with the pilot element, the spindle being arranged to actuate the pilot element.

4. The top cover according to claim 3, wherein the manual opening arrangement and the pilot arrangement are arranged in a stacked configuration.

5. The top cover according to claim 3, wherein the manual opening arrangement and the pilot arrangement form a common sub-assembly.

6. The top cover according to claim 2, wherein the manual opening arrangement and the pilot arrangement are arranged in a stacked configuration.

7. The top cover according to claim 2, wherein the manual opening arrangement and the pilot arrangement form a common sub-assembly.

8. The top cover according to claim 1, wherein the manual opening arrangement and the pilot arrangement are arranged in a stacked configuration.

9. The top cover according to claim 8, wherein the manual opening arrangement and the pilot arrangement form a common sub-assembly.

10. The top cover according to claim 1, wherein the manual opening arrangement and the pilot arrangement form a common sub-assembly.

11. The top cover according to claim 1, wherein the top cover comprises two or more pilot valves arranged in a common pilot fluid flow path through the top cover, the top cover being adapted to block the pilot fluid flow path between two of the pilot valves.

12. The top cover according to claim 11, wherein a pilot fluid passage fluidly connecting a first pilot valve and a second pilot valve mounted to the top cover, the first pilot valve blocking the pilot fluid passage to the second pilot valve when the first pilot valve is in a closed state.

13. The top cover according to claim 1, wherein the top cover is adapted to provide a protected soft-open operation mode and a non-protected soft-open operation mode.

14. The top cover according to claim 13, wherein the top cover comprises three or more pilot valve sockets.

15. The top cover according to claim 1, wherein the pilot arrangement comprises a pilot element which comprises the fluid conduit, the pilot element comprising an inlet orifice and an outlet orifice for passing a pilot fluid flow through the fluid conduit of the pilot element.

16. A soft throttling valve comprising:
    an inlet;
    an outlet; and
    a main valve having a valve seat between said inlet and said outlet, the soft throttling valve comprises a pilot arrangement arranged to throttle the pilot fluid flow, the pilot arrangement being arranged to throttle the pilot fluid flow depending on a degree of opening of the main valve, wherein the soft throttling valve comprises at least two pilot valves wherein a first pilot valve can be opened in a first step and a second pilot valve can then be opened in a second step and the top cover and the soft throttling valve further comprises a manual opening arrangement for manually opening the main valve and/or the soft throttling valve being adapted to prevent a step-wise opening of the main valve in less than two opening steps, wherein the soft throttling valve is arranged for throttling the main valve in such a way that a pressure shock is reduced.

17. The soft throttling valve according to claim 16, wherein the manual opening arrangement is arranged to actuate a pilot element of the pilot arrangement so as to manually open the main valve.

18. The soft throttling valve according to claim 16, wherein the soft throttling valve comprises two or more pilot valves arranged in a common pilot fluid flow path through the soft throttling valve, the soft throttling valve being adapted to block the pilot fluid flow path between two of the pilot valves.

19. The soft throttling valve according to claim 16, wherein the soft throttling valve comprises a soft throttling valve body and a top cover.

\* \* \* \* \*